United States Patent
Maerkze

(10) Patent No.: US 9,139,251 B2
(45) Date of Patent: Sep. 22, 2015

(54) MECHANISM FOR CONVERTING RECIPROCATING LEVER ACTION TO UNIDIRECTIONAL ROTARY MOTION

(75) Inventor: James T. Maerkze, Kenosha, WI (US)

(73) Assignee: WISYS TECHNOLOGY FOUNDATION, Madison, WI (US)

( * ) Notice: Subject to any disclaimer, the term of this patent is extended or adjusted under 35 U.S.C. 154(b) by 0 days.

(21) Appl. No.: 14/115,441

(22) PCT Filed: May 4, 2012

(86) PCT No.: PCT/US2012/036568
§ 371 (c)(1),
(2), (4) Date: Nov. 4, 2013

(87) PCT Pub. No.: WO2012/151511
PCT Pub. Date: Nov. 8, 2012

(65) Prior Publication Data
US 2014/0070515 A1    Mar. 13, 2014

Related U.S. Application Data

(60) Provisional application No. 61/518,269, filed on May 4, 2011.

(51) Int. Cl.
| | |
|---|---|
| *B62M 1/28* | (2013.01) |
| *A61G 5/02* | (2006.01) |
| *B62M 1/16* | (2006.01) |
| *F16H 19/08* | (2006.01) |
| *A61G 5/10* | (2006.01) |

(52) U.S. Cl.
CPC ................. *B62M 1/28* (2013.01); *A61G 5/023* (2013.01); *A61G 5/025* (2013.01); *B62M 1/16* (2013.01); *F16H 19/08* (2013.01); *A61G 2005/1054* (2013.01); *F16H 2019/085* (2013.01); *Y10T 74/1856* (2015.01)

(58) Field of Classification Search
CPC ............ B62M 1/24; B62M 1/28; B62M 1/30; B62M 1/26
USPC .......... 280/253, 256, 255, 258, 252, 244, 250
See application file for complete search history.

(56) References Cited

U.S. PATENT DOCUMENTS

| | | | | |
|---|---|---|---|---|
| 4,574,649 | A  * | 3/1986 | Seol ................................ | 74/138 |
| 6,585,277 | B1 * | 7/2003 | Monteagudo ................. | 280/244 |
| 6,764,089 | B2 * | 7/2004 | Drymalski .................... | 280/246 |
| 7,195,264 | B2 * | 3/2007 | Drymalski .................... | 280/246 |
| 7,753,386 | B2 * | 7/2010 | Drymalski .................... | 280/243 |
| 8,157,280 | B2 * | 4/2012 | Drymalski .................... | 280/244 |

(Continued)

FOREIGN PATENT DOCUMENTS

| | | |
|---|---|---|
| DE | 3624324 | 1/1988 |
| GB | 24481 | 0/1914 |

*Primary Examiner* — Kevin Hurley
*Assistant Examiner* — Michael Stabley
(74) *Attorney, Agent, or Firm* — Boyle Fredrickson, S.C.

(57) ABSTRACT

A mechanism, e.g. for driving a wheelchair, converting oscillating motion of a lever (15) into rotary motion of an output disc (capstans 34) by means of a flexible member (belt 26). In one direction of the lever (15), the belt (26) drives the output disc (capstans 24). In the other direction, the belt (26) slips. This is achieved by a (rotary) drag element (22) providing a (rotary) resistance force (=counter force) upstream the output disc (34) thereby tensioning the belt (26) such that slip is avoided.

17 Claims, 8 Drawing Sheets

(56) References Cited

U.S. PATENT DOCUMENTS

| | | | |
|---|---|---|---|
| 2003/0116939 A1* | 6/2003 | Monteagudo | 280/244 |
| 2005/0087952 A1* | 4/2005 | Drymalski | 280/244 |
| 2010/0264621 A1* | 10/2010 | Drymalski | 280/244 |

* cited by examiner

MECHANISM FOR CONVERTING RECIPROCATING LEVER ACTION TO UNIDIRECTIONAL ROTARY MOTION

CROSS-REFERENCE TO RELATED APPLICATION

This application claims the benefit of U.S. provisional application 61/518,269 filed May 4, 2011 and hereby incorporated by reference.

BACKGROUND OF THE INVENTION

The present application relates to a drive mechanism that coverts reciprocating linear motion of a lever into rotary motion in a single selectable direction and, further, to a wheelchair or other manually propelled vehicle incorporating such a drive mechanism.

The mechanics of a traditional wheelchair have long remained unchanged. Typically, an operator uses her hands to roll the wheels that are located on either side of a seat. The rotation of the wheels in turn propels the wheelchair. However, this form of operation requires the operator to possess both the necessary upper body range of motion and strength to reach and push the wheels. Unfortunately, many persons such as elderly, young children, and those afflicted with ailments that limit both upper and lower body function are not capable of using a traditional wheelchair.

One approach to simplifying the operation of a wheelchair uses levers that may be gripped by the user instead of the wheels. Reciprocating motion of the levers then serves to propel the wheelchair forward.

SUMMARY OF THE INVENTION

The present invention provides an improved drive mechanism that coverts reciprocating linear motion of a lever into rotary motion using a belt passing over one or more capstans. A drag element selectively tensions the belt to cause it to grip the capstans with one direction of belt motion and release the capstan with another direction of belt motion. The rotatable capstans in turn engage an output shaft, which may be a wheel axle.

Specifically, one embodiment of the invention provides a mechanism for converting a reciprocating action to unidirectional rotary motion having a frame with a lever attached to the frame to pivot about a pivot point and an output shaft attached to the frame to rotate about a shaft axis. A first flexible belt communicates with the lever to move in a first and second direction along the length of the first flexible belt with reciprocating of the lever, and a first rotatable capstan is coupled to the output shaft and provides an outer wall contacting a surface of the first flexible belt with movement of the first flexible belt. A first drag element provides an outer wall contacting a surface of the first flexible belt with movement of the first flexible belt, the first drag element adapted to apply a drag tension against the first flexible belt so that the first flexible belt tightens against the outer wall of the rotatable capstan to rotate the same with a first direction of reciprocation of the lever and so that the first flexible belt loosens against the outer wall of the rotatable capstan with a second direction of reciprocation of the lever to not rotate the same.

It is thus a feature of at least one embodiment of the invention to provide a belt mechanism for converting lever action into rotary motion eliminating the noise and complexity of ratchet mechanisms and the like.

The first drag element may provide an operator switching the drag element between a drag mode applying the drag tension against the first flexible belt and a non-drag mode not applying the drag tension against the first flexible belt.

It is thus a feature of at least one embodiment of the invention to provide a simple mechanism for enabling and disabling the belt drive.

The mechanism may include a second drag element providing an outer wall contacting a surface of the first flexible belt with movement of the first flexible belt, the second drag element being positioned on an opposite side of the first rotatable capstan with respect to the first drag element, the second drag element adapted to apply a drag tension against the first flexible belt so that the first flexible belt tightens against the outer wall of the rotatable capstan to rotate the same with a second direction of reciprocation of the lever and so that the first flexible belt loosens against the outer wall of the capstan with a first direction of reciprocation of the lever to not rotate the same.

It is thus a feature of at least one embodiment of the invention to permit the direction of motion to be easily changed.

The rotatable capstan may communicate with the output shaft through a gear linkage.

It is thus a feature of at least one embodiment of the invention to permit the introduction of an arbitrary mechanical advantage into the drive chain.

The mechanism may include multiple rotatable capstans each having outer walls contacting the surface of the first flexible belt with movement of the first flexible belt wherein the first drag is adapted to apply a drag tension against the first flexible belt so that the first flexible belt tightens against the outer wall of each of the multiple rotatable capstans to rotate the same with a first direction of reciprocation of the lever and so that the first flexible belt loosens against the outer wall of each of the multiple rotatable capstans with a second direction of reciprocation of the lever to not rotate the same.

It is thus a feature of at least one embodiment of the invention to provide a method of flexibly scaling the total contact force between the belt and capstans for a given belt tension.

The drag element may be selected from the group consisting of a hydraulic dash pot providing an operator-controlling bypass of hydraulic fluid through the dash pot and an electric generator wherein the operator is a switch-controlling bypass of electrical current through the electric generator.

It is thus a feature of at least one embodiment of the invention to provide readily switchable drag elements.

The flexible belt may be a polymeric composite material.

It is thus a feature of at least one embodiment of the invention to provide a lightweight, strong, and quiet drive element.

A second flexible belt communicates with the lever to move in a first and second direction along the length of the belt with reciprocating of the lever and a second rotatable capstan coupled to the output shaft, wherein the second rotatable capstan provides an outer wall contacting a surface of the second flexible belt with movement of the second flexible belt. A second drag element may provide an outer wall contacting a surface of the second flexible belt with movement of the second flexible belt, the second drag element adapted to apply a drag tension against the second flexible belt so that the flexible belt tightens against the outer wall of the second rotatable capstan to rotate the same with a second direction of reciprocation of the lever and so that the second flexible belt loosens against the outer wall of the rotatable capstan with a first direction of reciprocation of the lever to not rotate the same.

It is thus a feature of at least one embodiment of the invention to capture both the forward and reverse action of the lever in providing a given direction of motion to the output shaft.

The mechanism may include a wheelchair and the output shaft may be mechanically coupled to a wheel of the wheelchair.

It is thus a feature of at least one embodiment of the invention to provide an improved wheelchair using lever action.

These particular objects and advantages may apply to only some embodiments falling within the claims and thus do not define the scope of the invention.

DETAILED DESCRIPTION OF THE PREFERRED EMBODIMENT

Figure 1:
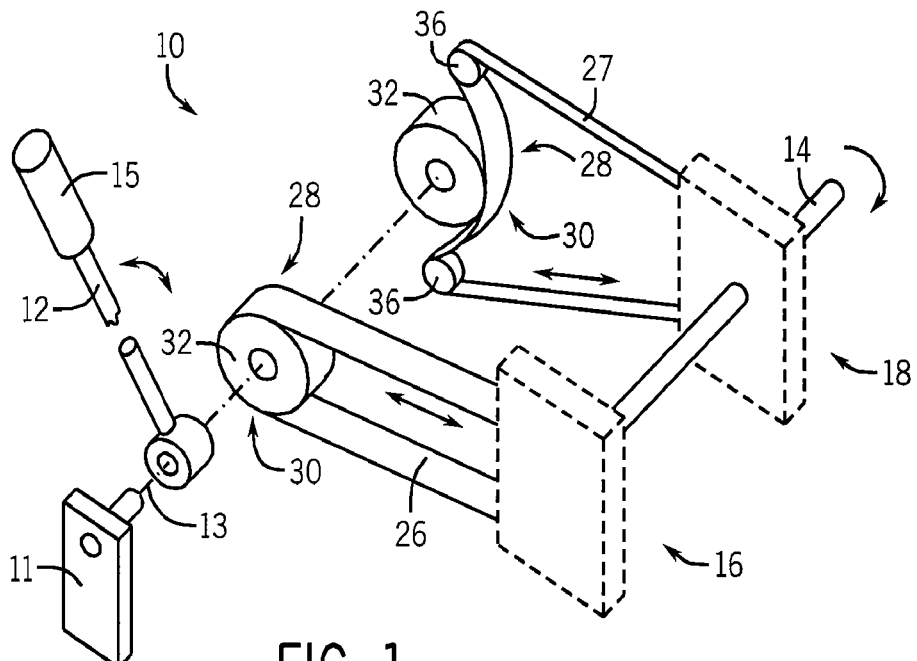
FIG. 1 is a simplified exploded view of a drive mechanism according to an embodiment of the present invention showing a drive belt attached to a lever, each communicating with the capstan assembly.

Referring now to FIG. 1, a drive mechanism 10 for converting linear reciprocating motion of a lever 12 into rotational motion of a rotary output shaft 14 may include a paired first and second drive assembly 16, 18, which operate alternatingly when the lever 12 is reciprocated (an "extension" stroke or a "retraction" stroke) to rotate the output shaft 14. As will be discussed in detail below, a first drive assembly 16 is activated during one stroke of the lever 12, while the alternate second drive assembly 18 is deactivated. Subsequently, when the lever 12 is moved in the opposite direction, the first drive assembly 16 is deactivated while the alternate second drive assembly 18 is activated. The lever 12 may be mounted to pivot about an axis 13 defining a pivot point with respect to a frame 11. One end of the lever 12 removed from the pivot point and axis 13 may include a handgrip 15 for gripping by a human hand.

Through this alternating activation of the drive assemblies 16, 18 the rotary output shaft 14 may maintain rotation in a consistent direction. As will also be detailed below, the particular drive assemblies 16, 18 that are activated for a particular stroke of the lever 12 may be switched to allow the rotary output shaft 14 to rotate in the opposite direction, i.e., reverse.

Referring still to FIG. 1, the first and second drive assemblies 16, 18 each comprise a capstan array 20, a first and second drag element 22 and 24, and a first and second flexible belt 26 and 27. The first flexible belt 26, for example formed of a polymeric material possibly with reinforcing fibers of glass or the like, engages the lever 12 at engagement point 28 and extends to the capstan array 20 for the first drive assembly 16. The first flexible belt 26 engages a drag element 22 positioned between the lever 12 and the capstan array 20. As will be discussed below, the drag element 22 provides for a cylindrical wheel frictionally engaging the belt 26 to provide a resistive drag to movement of the belt 26.

The first flexible belt 26 then returns to the lever 12 at the second engagement point 30 from the capstan array 20 after passing by drag element 24. Drag element 24, like drag element 22, engages the flexible belt 26 with a cylindrical wheel that frictionally contacts the first flexible belt 26.

Likewise the second flexible belt 27 engages the lever 12 at engagement point 28 and extends to a capstan array 20 for the second drive assembly 18 passing by drag element 22 (independent of the drag element 22 associated with the first belt 26 but identically constructed) and then returns from the capstan array 20 to the engagement point 30 after passing by the drag element 24 (independent of the drag element 24 associated with the first belt 26 but identically constructed).

These engagement points 28, 30 may be a fixed point on the lever 12 or, as shown in FIG. 1, may be points on a drive wheel 32 which rotates in conjunction with the reciprocal movement of the lever 12. The drive wheel 32 may present an outer cylindrical surface for frictionally engaging a smooth surface of the belt 26 or 27.

Figure 2:
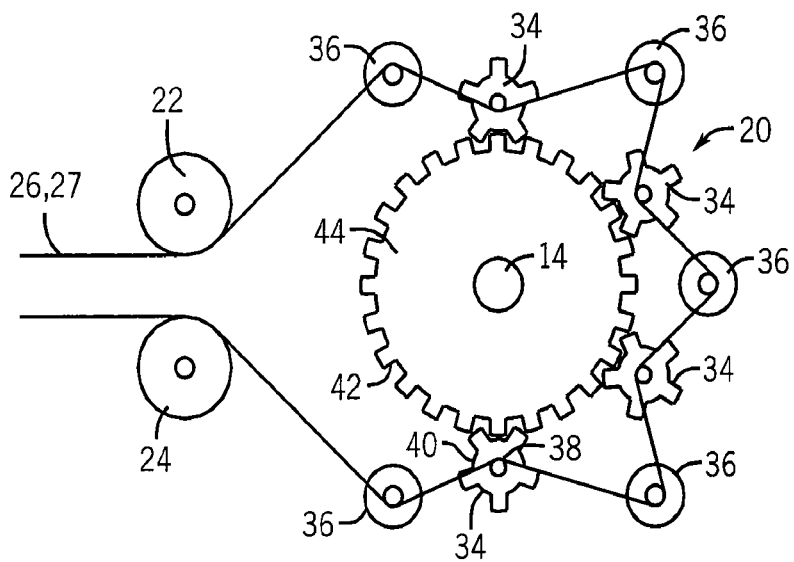
FIG. 2 is a side elevation view of the capstan assembly of FIG. 1 showing passage of the belt around multiple capstans communicating with an output shaft and further passing around drag elements.

Referring now to FIG. 2, for each of the first and second drive assemblies 16, 18, the belt 26 and 27 is threaded through the capstan array 20 such that it at least partially engages an outer cylindrical surface of each of the capstans 34. Generally, the interface between the belt 26 and 27 and the outer cylindrical surface of the capstans 34 is smooth without teeth or the like to provide only frictional engagement. In one embodiment, the flexible belts 26 and 27 may also be threaded through rotating bushings 36 located between adjacent capstans 34 in the array 20, as to redirect the flexible belt 26 and increase the engagement of the flexible belt 26 around the capstans 34 by increasing the angular contact area between the two.

Figure 10:
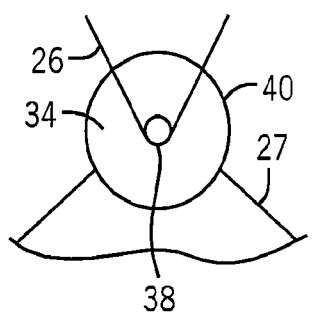
FIG. 10 is a side elevation view of a capstan engaging two flexible belts in accordance with an alternative embodiment of the present invention.

Referring momentarily to FIG. 10, in an alternative embodiment, the first and second assembly 16, 18 may utilize a single common capstan array 20, with the flexible belts 26 and 27 of each assembly 16, 18 engaging opposing sides of the capstans 34 within the array 20.

Referring again to FIG. 2, the capstans 34 within the array 20 may co-rotate with corresponding attached spur gears 40 that are axially parallel with axes of both other capstans 34 in the array 20 and the rotary output shaft 14. The teeth of the spur gears 40 may engage corresponding teeth of a rotary gear 44 driving the output shaft 14.

Figure 14:
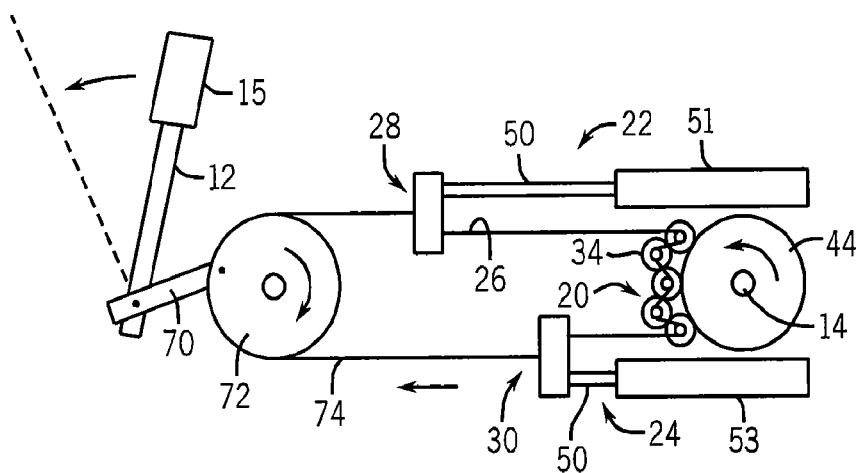
FIG. 14 is a side elevation view of a portion of a drive mechanism assembly according to yet another alterative embodiment of the present invention.

Referring momentarily to FIG. 14, in one embodiment the teeth of alternate spur gears 40 of the capstans 34 may engage spur gears of adjacent capstans 34, which rotate in an opposite direction within the array 20, rather than directly engaging the rotary gear 44. The remaining spur gears 40 may communicate directly with rotary gear 44. Alternatively, the capstan array 20 and rotary output shaft 14 may be rotatably engaged to one another by means other than teeth such as through frictional contact, belts, chains or the like. This orientation eliminates the need for rotating bushings 36 to be placed between adjacent capstans 34 to redirect the flexible belt 26 and any associated energy loss therewith.

Figure 3A:
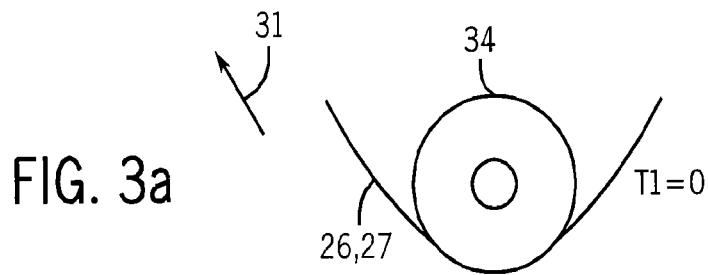
FIG. 3a is a side elevation view of a capstan of FIG. 2 with a corresponding upstream drag element deactivated to allow the belt to slide in a first direction along the capstan.

Referring now to FIG. 3a, when the flexible belts 26 and 27 move in a first direction 31 corresponding to movement of the lever 12 in an retraction stroke (for belts 26) and in an extension stroke (for belt 27), the flexible belts 26 and 27 slide over the capstans 34 when the upstream drag element 24 of the assembly 16, 18 is deactivated. This sliding does not cause the capstans 34 to rotate about their axes.

Figure 3B:
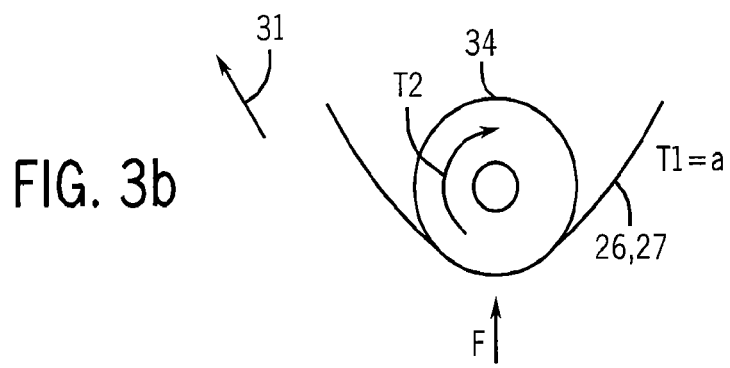
FIG. 3b is a side elevation view of the capstan of FIG. 2 with the upstream drag element activated to cause the belt to grip the capstan as it moves in the first reaction.

Alternatively, as shown in FIG. 3b when the upstream drag element 24 is activated and the lever 12 is moved to cause movement of the flexible belts 26 and 27 in the first direction 31, sufficient tension or drag is placed on the flexible belt 26 such that the flexible belt 26 will engage and grip the outer wall 38 of each capstan 34, thereby forcing the capstans 34 to rotate about their axes. This rotation of the capstans 34 will in turn rotate the rotary gear 44 and output shaft 14.

When activated, the force on each capstan 34 can be substantially larger than the force of tension provided by the drag element on the flexible belt 26 according to equation (1) below:

$$\ln(T2/T1) = \mu\beta \tag{1}$$

where T1 equals the tension on the flexible belt 26, T2 equals the force rotating the capstan 34, μ equals the friction between the flexible belt 26 and the outer wall 38 of the capstan 34, and β equals the number of revolutions the flexible belt 26 makes about the outer wall 38 in radians. The total force imparted to the rotary gear 44 of the output shaft 14 will of course be a summation of T2 times the number of capstans 34 within the array 20. The array 20 may include any combination of two or more capstans 34.

Figure 3C:
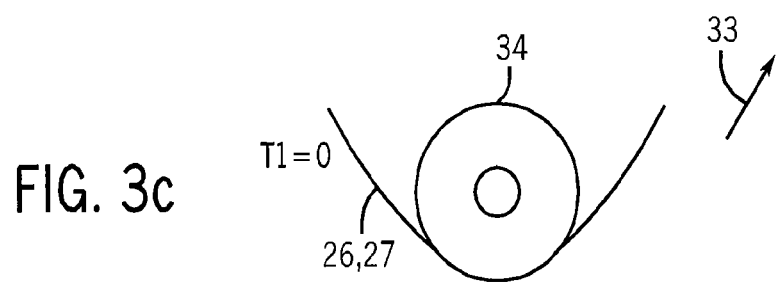
FIG. 3c is a side elevation view similar to FIG. 3a with the belt moving in the second direction.

Referring now to FIG. 3c, when the flexible belts 26 and 27 move in a second direction 33 corresponding to movement of the lever 12 in an extension stroke (for belts 26) and in a retraction stroke (for belt 27), the flexible belts 26 and 27 slide over the capstans 34 when the upstream drag element 22 of the assembly 16, 18 is deactivated. This sliding does not cause the capstans 34 to rotate about their axes.

Figure 3D:
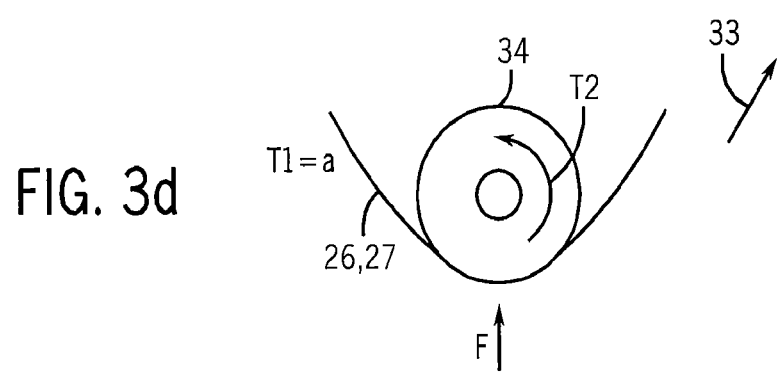
FIG. 3d is a side elevation view similar to FIG. 3b with the belt moving in the second direction.

Alternatively, as shown in FIG. 3d when the upstream drag element 22 is activated and the lever 12 is moved to cause movement of the flexible belts 26 and 27 in the second direction 33, sufficient tension or drag is placed on the flexible belt 26 such that the flexible belt 26 will engage and grip the outer wall 38 of each capstan 34, thereby forcing the capstans 34 to rotate about their axes. This rotation of the capstans 34 will in turn rotate the rotary gear 44 and output shaft 14.

Again, the force on each capstan 34 can be substantially larger than the force of tension provided by the drag element on the flexible belt 26 according to equation (1) above.

Figure 12:
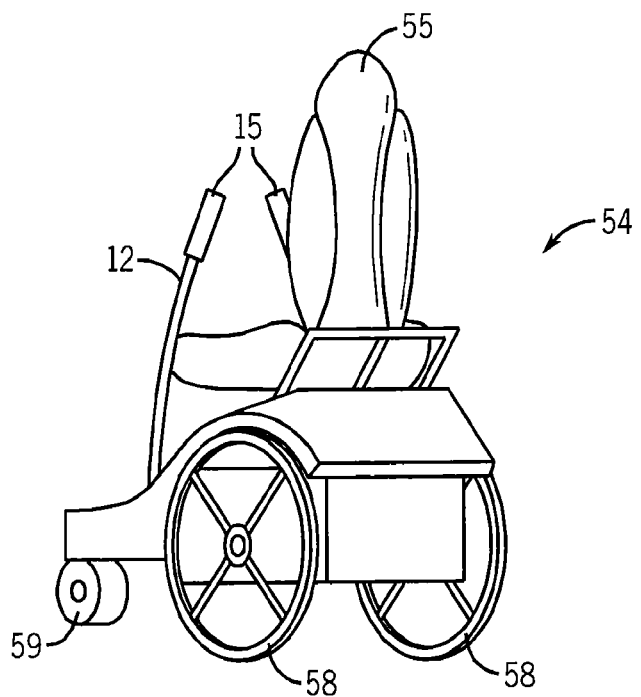
FIG. 12 is a perspective view of wheelchair including the drive mechanism shown in FIG. 1.

Referring momentarily to FIG. 12, in one embodiment, the drive mechanism 10 described above may be incorporated into a wheelchair 54. The wheelchair 54 may provide a seat 55 resting on the frame 11 and flanked by wheels 58 placed approximately beneath the center of gravity of the seated individual on the seat 55. Guide rollers 59 may be positioned in front of the seat to provide stability. Flanking the seat 55, on each of the left and right sides of the seat 55, may be levers 12 communicating with the drive mechanism 10 discussed above.

Figure 11:
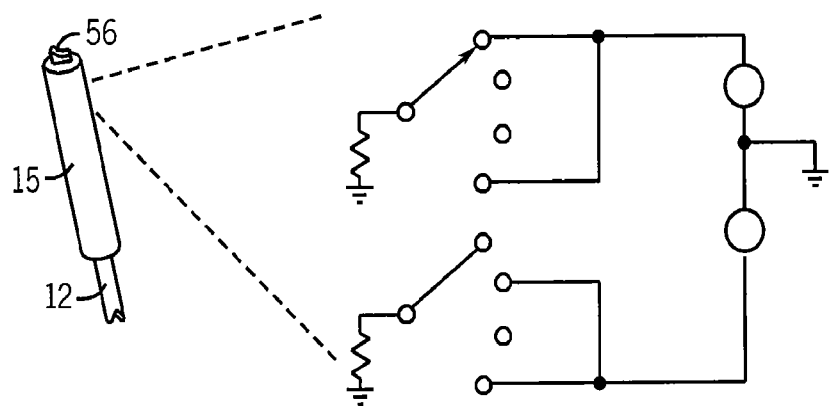
FIG. 11 is a partial schematic view of an electrical circuitry and lever actuated switch for selectively activating the tensioning devices of the drive mechanism shown in FIG. 1.

In use, the operator of the wheelchair 54 may select the desired direction of wheel rotation, i.e., forwards or reverse. This selection may be made by use of a switch 56 or button, as seen in FIG. 11 and as will be discussed below, which controls which of the drag elements 22 or 24 is activated. Each wheel 58 of the wheelchair 54 may be actuated independently by moving the associated lever 12. Independent control of movement of the wheels 58 and their direction provides a high degree of maneuverability and control.

Figure 4:
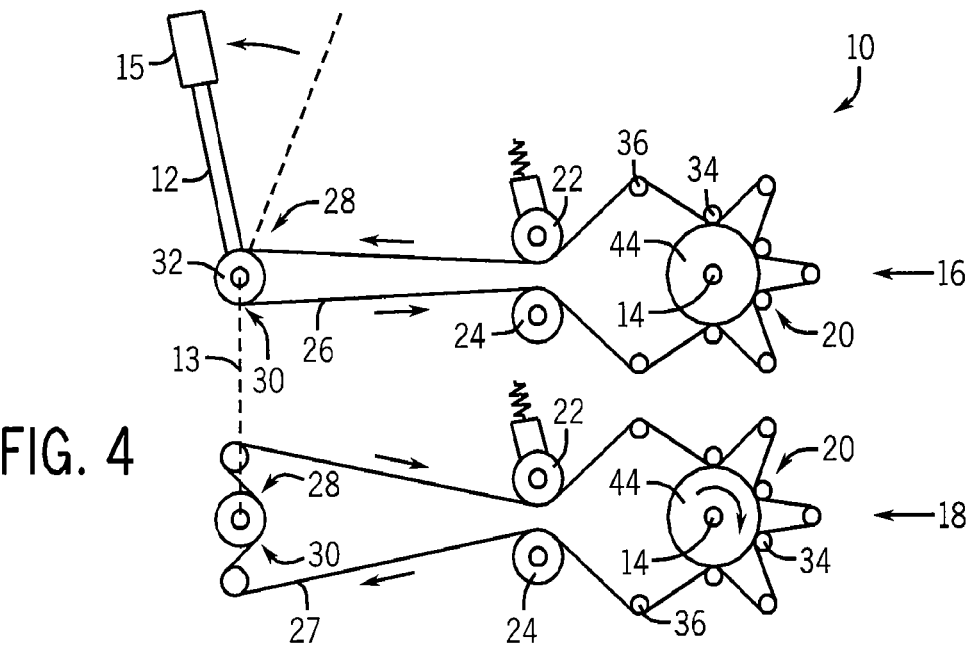
FIG. 4 is a simplified exploded view of the drive mechanism shown in FIG. 1, when the lever is activated to produce clockwise rotation of the output shaft in response to the forward stroke of the lever.

Referring now to FIG. 4, we will consider first the case where the operator has elected to reverse the wheel 58, as designated by the clockwise direction of an arrow shown on the rotary gear 44. With the reverse direction selected, drag elements 22 will be activated and drag elements 24 will be deactivated. When the operator extends the lever 12 through the forward stroke, linear movement of the lever 12 will translate into counterclockwise rotational movement of the drive wheel 32 associated with corresponding counterclockwise rotational movement of the flexible belt 26 (as indicated with arrows) for a drive assembly 16. Simultaneously, the flexible belt 27 in the second drive assembly 18, which is counter wound relative to the first assembly around the drive wheel 32, will travel in the clockwise direction.

As noted, given that the operator has elected to reverse the wheel 58, the first drag element 22 of the second assembly 18 will activate to apply a tension to the flexible belt 26 of the second assembly 18. This drag element 22 is upstream of the capstan array 20 and thus will activate the rotation of the capstan array 20 with the movement of the taut flexible belt 26, and subsequently rotate the rotary gear 44 and output shaft 14 in the clockwise direction. The second drag element 24 of the second assembly 18 will remain deactivated to allow the taut flexible belt 26 to be pulled over the second drag element 24 towards the second engagement point 30.

On the other hand, the second drag element 24 of the first drive assembly 16, which is upstream of the belt movement for the second drive assembly 16, will remain deactivated to keep the flexible belt 26 of the first drive assembly 16 loose, such that it will pass over the capstan array 20 without inducing rotation thereof. Activation of the first drag element 22 of the first drive assembly 16 will have no effect because it is downstream from the capstan array 20.

Figure 5:
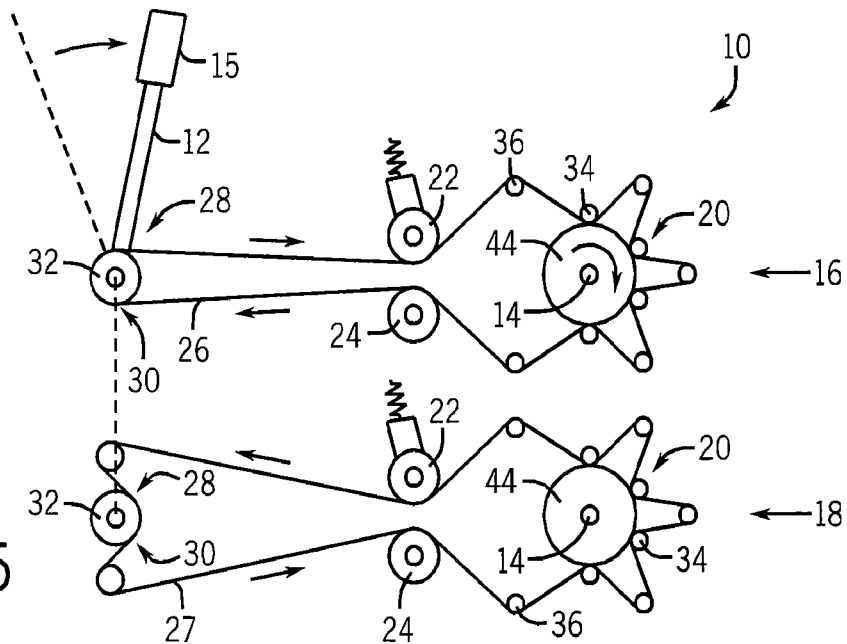
FIG. 5 is a simplified exploded view of the drive mechanism shown in FIG. 1, when the lever is activated to produce clockwise rotation of the output shaft in response to the backward stroke of the lever.

Referring now to FIG. 5, when the operator retracts the lever 12 through the reverse stroke, linear movement of the lever 12 will translate into clockwise rotational movement of the drive wheel 32 with corresponding clockwise rotational movement of the flexible belt 26 (as indicated with arrows) for a drive assembly 16. Simultaneously, the flexible belt 27 in the second drive assembly 18, which is counter wound relative to the first assembly around the drive wheel 32, will travel in the counter clockwise direction.

Under the above conditions in which the operator has still elected to reverse the wheel 58, the first drag element 22 of the first drive assembly 16 will be active to apply a tension onto the flexible belt 26 of the first drive assembly 16 as it passes through the capstan array 20. This tension will cause the rotation of the capstan array 20 under the pressure of the taut flexible belt 26, and will rotate the rotary gear 44 and output shaft 14 in the clockwise direction. The second drag element 24 of the first drive assembly 16 will remain deactivated so as not to interfere with passage of the belt 26. At the same time, the second drag element 24 of the second assembly 18 will remain deactivated to keep the flexible belt 27 of the second assembly 18 loose, such that it will pass over the capstan array 20 without inducing rotation thereof. The first drag element 22 of the second assembly 18 will be activated but without practical effect.

Figure 6:
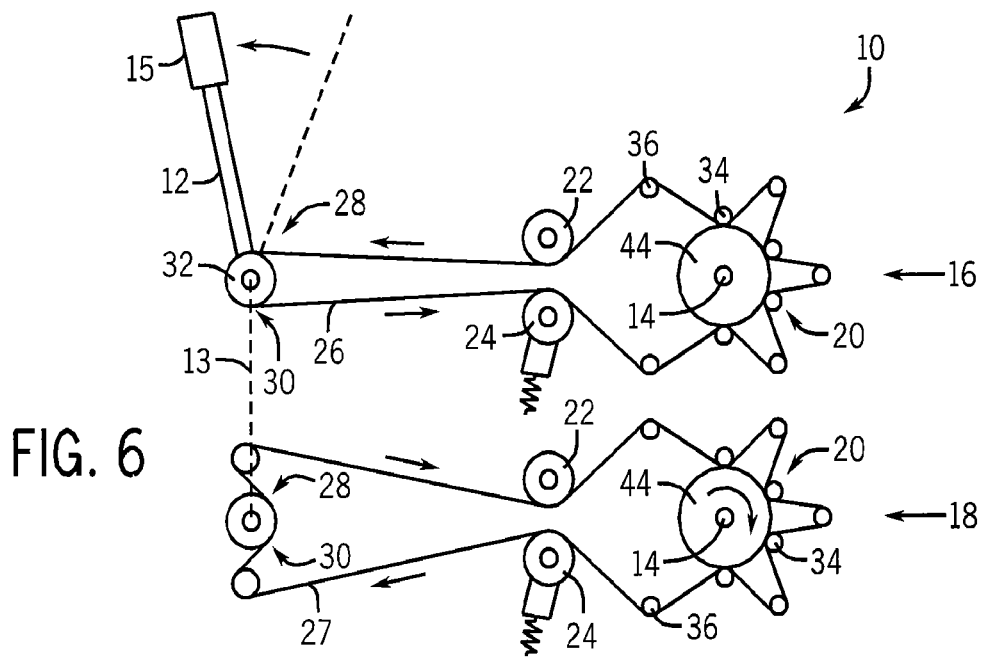
FIG. 6 is a simplified exploded view of the drive mechanism shown in FIG. 1, when the lever is activated to produce counterclockwise rotation of the output shaft in response to the forward stroke of the lever.

Turning now to FIG. 6, the case where the operator has elected to rotate the wheel 58 forward will now be considered such as will provide a counterclockwise direction of the rotary gear 44 shown by the arrow. When the operator extends the lever 12 in a forward stroke, linear movement of the lever 12 will translate into counterclockwise rotational movement of the drive wheel 32 associated therewith to drive the flexible belt 26 in the first drive assembly 16 to travel in counterclockwise direction (as indicated with arrows). Simultaneously, the flexible belt 27 in the second assembly 18, which is counterwound relative to the first drive assembly 16, will travel in the clockwise direction. The second drag element 24 of the first drive assembly 16 will be actively applying a tension onto the flexible belt 26 of the first drive assembly 16 as it passes through the capstan array 20. This tension will rotate the capstan array 20 with the movement of the taut flexible belt 26 and subsequently rotate the rotary gear 44 and output shaft 14 in the counterclockwise direction. The first drag element 22 of the first drive assembly 16 will remain deactivated to allow the flexible belt 26 to pass freely over the first drag element 22, towards the first engagement point 28.

Simultaneously, the first drag element 22 of the second assembly 18 will remain deactivated to keep the flexible belt 27 of the second assembly 18 loose as it passes over the capstan array 20 without inducing rotation thereof; and the second drag element 24 of the second assembly 18 will be activated to prevent pulling force from the lever 12 from being translated through the capstan array 20.

Figure 7:
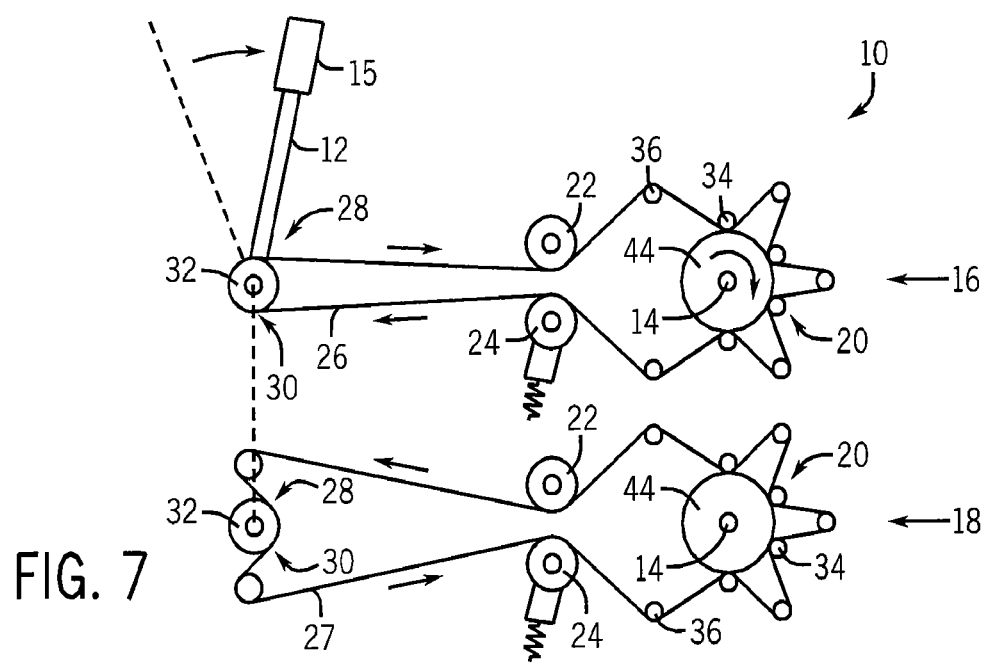
FIG. 7 is a simplified exploded view of the drive mechanism shown in FIG. 1, when the lever is activated to produce counterclockwise rotation of the output shaft in response to the backward stroke of the lever.

As seen in FIG. 7, with the forward direction still selected, the operator may retract the lever 12 through the backwards stroke. Linear movement of the lever 12 will translate into clockwise rotational movement of the drive wheel 32 associated therewith and move the flexible belt 26 in the first drive assembly 16 to travel in clockwise direction (as indicated with arrows). Simultaneously, the flexible belt 26 in the second assembly 18 will travel in the counterclockwise direction. Having elected to rotate the wheel 58 in the forward direction, the second drag element 24 of the second assembly 18 will be activate to apply a tension onto the flexible belt 26 of the second assembly 18. This tension will activate the rotation of the capstan array 20 with the movement of the taut flexible belt 26, and subsequently rotate the rotary gear 44 and output shaft 14 in the counterclockwise direction. The first drag element 22 of the second assembly 18 will remain deactivated to allow the taut flexible belt 26 to pass freely toward the first engagement point 28. The first drag element 22 of the first drive assembly 16 will remain deactivated to keep the flexible belt of the first drive assembly 16 loose such that it will pass over the capstan array 20 without inducing rotation thereof; and the second drag element 24 of the first drive assembly 16 will be activated to prevent pulling force from the lever 12 from being translated through the capstan array 20.

Accordingly, by selective engagement of the drag elements 22, 24 on the belts 26 and 27, the operator will be able to rotate the output shaft 14 and an associated wheelchair wheel 58 in either of two desired directions regardless of the direction of lever movement. By independently controlling both the direction and amount of movement, the operator will be able to both propel and steer the wheelchair 54 via the two drive mechanisms 10. Furthermore, if the operator wished to brake the rotational movement of one or both wheels 58 on the wheelchair 54, she would simply need to engage both drag elements 22, 24 in at least one of the paired drive assemblies 16, 18 on the given wheel 58. Similarly, by deactivating all of the drag elements 22, 24 in the paired drive assemblies 16, 18, the operator would be able to place one or both wheels 58 in a neutral position. This neutral position may be helpful when the operator is positioning the wheelchair 54 during transfers, or if another person were to assist in pushing the wheelchair 54.

Figure 8:
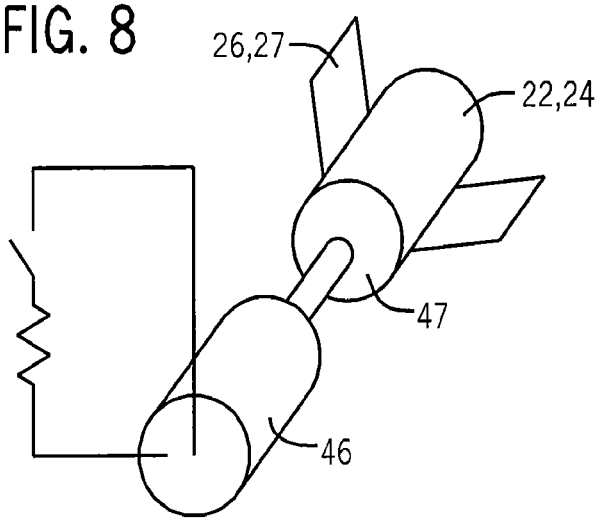
FIG. 8 is a partial schematic view of an electrical generator drag element in accordance with an alternative embodiment of the present invention.

Referring now to FIG. 8, drag elements 22 or 24 may each be an electrical generator 46, as seen in FIG. 8, which may be activated by shorting the windings of the generator 46 through a load resistor so as to dissipate mechanical energy into resistive heating. Activating or deactivating the drag elements 22 or 24 may then be accomplished simply by throwing a switch.

Figure 9:
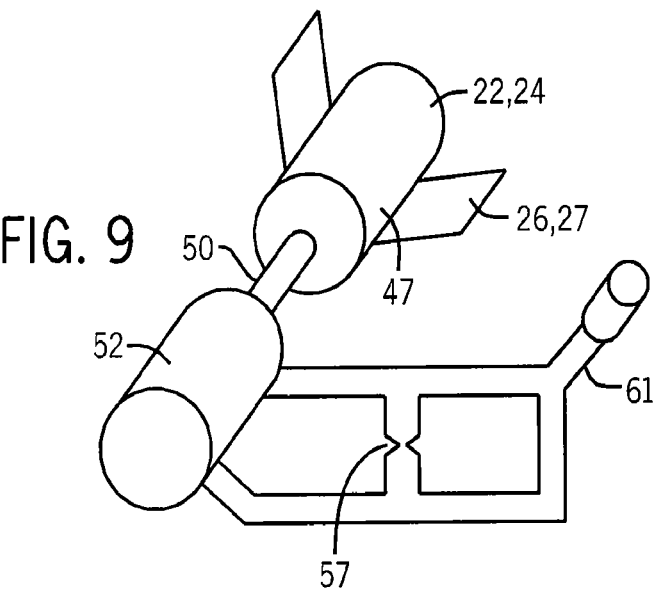
FIG. 9 is a partial schematic view of a hydraulic pump drag element in accordance with an alternative embodiment of the present invention.

Alternatively, as seen in FIG. 9, the drag elements 22, 24 may be a hydraulic pump 52 (generically a hydraulic dashpot) which extends an arm 50 engaging a pulley 47 with the flexible belt 26 or 27 thereby increasing the drag on the flexible belt 26 or 27 sufficient to activate the capstan array 20 when hydraulic fluid from the pump 52 is forced to pass through a restrictive orifice 57.

Opening a bypass valve 61 around the orifice 57 allows the hydraulic pump 48 to turn freely thereby releasing the tension in the flexible belt 26 sufficiently to allow the belt to slip freely through the capstan array 20, without inducing rotation of the capstans 34.

Figure 13:
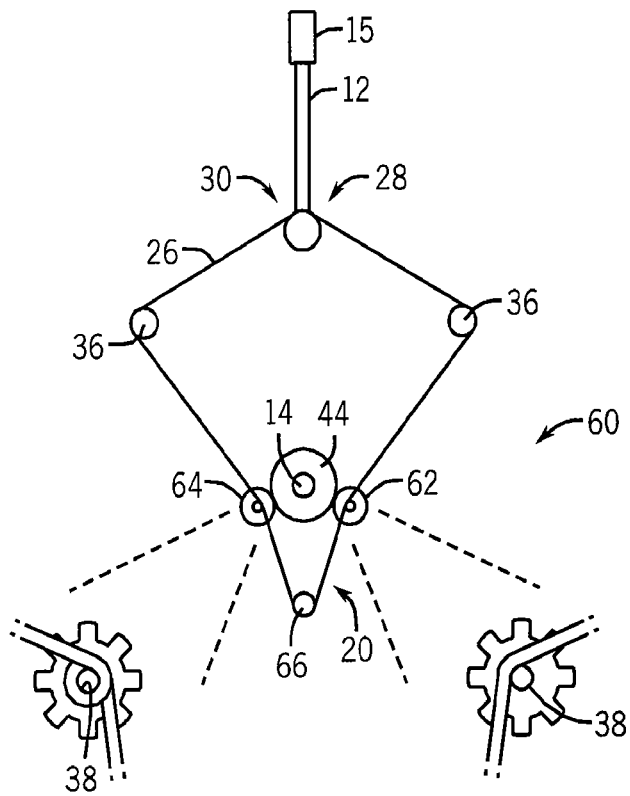
FIG. 13 is a side elevation view of a portion of a drive mechanism assembly according to an alternative embodiment of the present invention.

Referring now to FIG. 13, in an alternative embodiment of the drive mechanism 10, the drive assemblies 16 and 18 discussed above may be combined in a single drive assembly 60. In this embodiment of drive assembly 60, the capstan array 20 constitutes a first capstan 62 and a second capstan 64 flanking a single drag element 66, wherein the first capstan 62 is located closest to the first engagement point 28 of the flexible belt 26 and the second capstan 64 is located closest the second engagement point 30 of the flexible belt 26 while the flexible belt 26 is counter wound around the two capstans 62 and 64.

By locating the drag element 66 between the two capstans 62, 64, the drag element 66 will always be upstream of one of the single capstans 62 or 64 for each direction of the flexible belts 26 causing alternating engagement of the belt 26 with a proper one of the capstans 62 or 64 depending on the direction of movement of the belt 26 to provide unidirectional motion of the output shaft 14 and associated wheelchair wheel 58 with reciprocation of the lever 12. A second drive assembly (not shown) with the belt wound around the capstans in the opposite direction may be used for reversal of the wheel simply by activating or deactivating the drag element 66 for one of the two drive assemblies.

Referring now to FIG. 14, in yet another embodiment of the drive mechanism 10, a drive assembly 68 (corresponding to one of drive assembly 16 or 18) may provide that the lever 12 be received by a toggle arm 70 which in turn reciprocates a sprocket 72 over a rotation of approximately 180°. The sprocket 72 operates analogously to drive wheel 32 in the previous embodiments but instead of directly engaging the flexible belt 26, the teeth of the sprocket 72 engage a chain 74, which is connected to a first and second engagement point 28, 30. These engagement points 28 and 30 are also connected to the ends of the hydraulic arm 50 of a first and second hydraulic cylinder 51 and 53 providing the first and second drag elements 22, 24. This embodiment eliminates some of the slipping which may occur when the flexible belt 26 engages the lever 12 via a smooth drive wheel 32.

The hydraulic cylinders 51 and 53 may be activated and deactivated by use of an orifice and switch arrangement as described generally with respect to FIG. 9 above. Again, direct connection of the arms 50 to the engagement points 28 and 30 eliminates slippage that would otherwise be possible between the first and second drag elements 22 and 24 and the belt.

Figure 15:
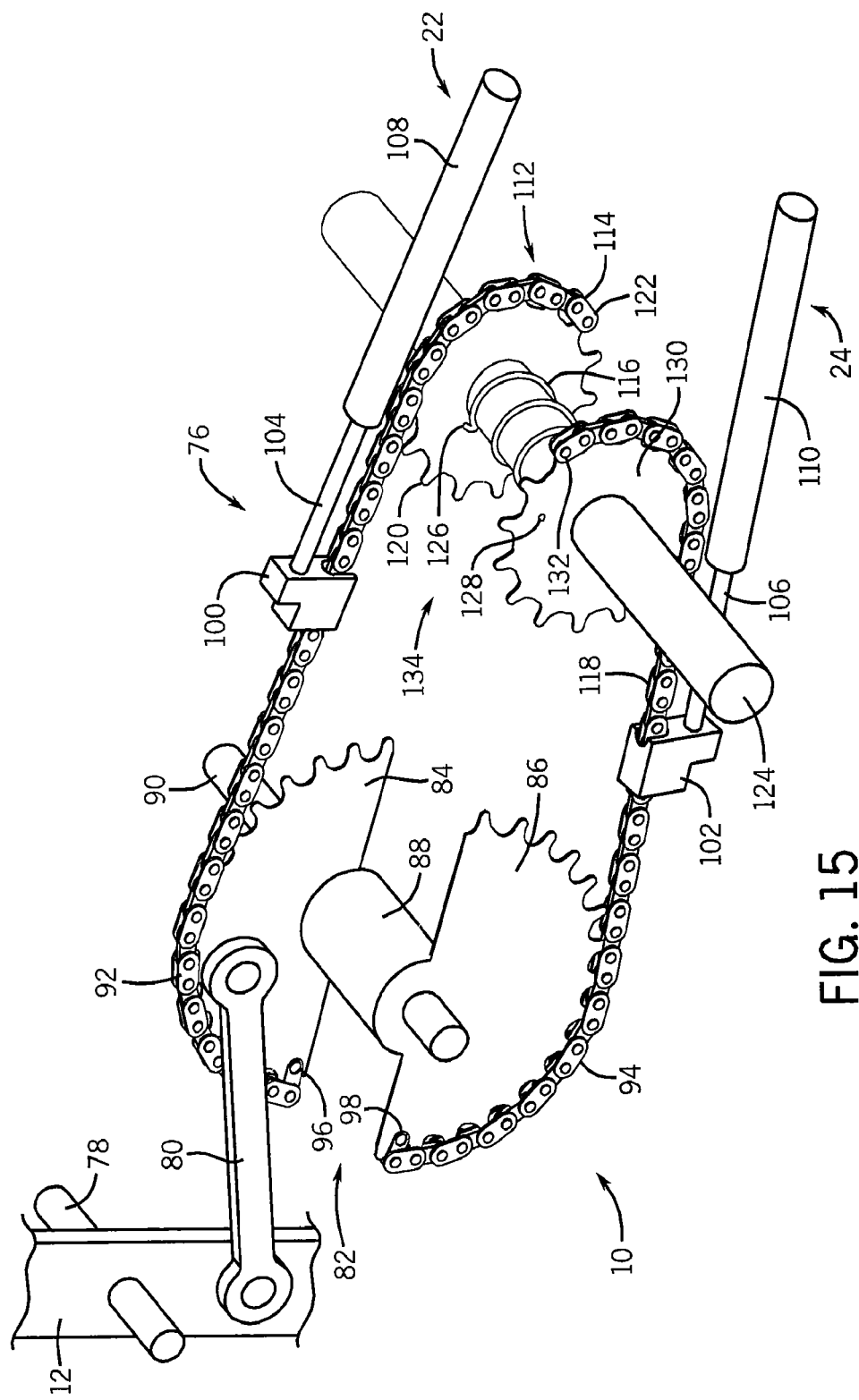
FIG. 15 is a simplified exploded view of the drive mechanism shown drive mechanism assembly according to yet another alterative embodiment of the present invention.

Referring now to FIG. 15, in yet another embodiment of the drive mechanism 10, a drive assembly 76 (corresponding to one of drive assembly 16 or 18) may provide that the lever 12, which is pivoted about pin 78, be rotatably received by a toggle arm 80 which in turn reciprocates a sprocket assembly 82 over a rotation of approximately 180°. The sprocket assembly 82 includes a first and second partial sprocket 84, 86 located on opposite sides of a centrally located sprocket hub 88 having an elongated slot configured to receive a sprocket axel 90 therein. The first and second partial sprockets 84, 86 are positions in a directionally opposed orientation relative to each other. The sprocket assembly 82 operates analogously to sprocket 72 in the previous embodiment as illustrated in FIG. 14, wherein the teeth of the first and second partial sprockets 84, 86 engage a first and second chain 92, 94 respectively, which are fixed to an end of the partial sprockets 84, 86 at first and second engagement points 96, 98 respectively. These chains 92, 94 extend from the engagement points 96, 98 to the linkage 100, 102 located on the ends of the hydraulic arm 104, 106 of the first and second hydraulic cylinder 108, 110. The hydraulic cylinders 108, 110 provide the first and second drag elements 22, 24, as was described in the previous embodiments. The hydraulic cylinders 108 and 110 may be activated and deactivated by use of an orifice and switch arrangement as described generally with respect to FIG. 9 above. Again, connection of the arms 104, 106 to the engagement points 96 and 98 via chains 92 and 94 eliminates slippage that would otherwise be possible between the first and second drag elements 22 and 24 and the belt.

Still referring to FIG. 15, the linkages 100, 102 also receive the belt 112 extending in an opposite direction from the first and second chains 92, 94. In the present embodiment the belt 112 includes at least three segments: a first capstan chain 114, a capstan coil 116, and a second capstan chain 118. The first capstan chain 114 engages the linkage 100 and extends in a direction opposite the lever 12, where it is engaged by the teeth of a first capstan gear 120 and fixed to the first capstan gear 120 at an engagement point 122. The capstan coil 116 may be a helical torsion spring that is wrapped around the output shaft 124. The capstan coil 116 includes a first and second end 126, 128. The first end of the capstan coil is fixed to the first capstan gear 120, while the second end of the capstan coil 128 is fixed to the second capstan gear 130. In its passive or disengaged orientation, the capstan coil 116 is biased away from the outer surface of the output shaft 124, such that the output shaft 124 can rotate freely, i.e., in a neutral or free-wheeling position. The second capstan gear 130 also received the second capstan chain 118 at the engagement point 132. From the engagement point 132, the second capstan chain 118 engages the teeth of the second capstan gear, as it extends back towards the direction of the lever 12 where it is fixed to the linkage 102 on the side opposite the second chain 94. In combination the belt 112 includes the first and second capstan chains 114, 118 and the capstan coil 116; wherein the first capstan chain 114 is indirectly fixed to the capstan coil 116 by way of the first capstan gear 120 at engagement points 122 and 126 respectively, and the capstan coil 116 is indirectly fixed to the second capstan chain 118 by way of the second capstan gear 130 at engagement points 128 and 132 respectively. As such, the movement of the belt 112 may be transferred through all three sections the first and second capstan chains 114, 118 and capstan coil 116, by way of the intervening capstan gears 120, 130. In this embodiments, the capstan 134, is composed of both the first and second capstan gears, and a capstan housing (not shown), with the belt 112 engaging the capstan 134 at both the teeth of the gears 120, 130 and the various wrappings of the capstan coil 116, located within the capstan housing (not shown).

As the drive assembly 76 seen in FIG. 15 corresponds to one of drive assembly 16 or 18, it is understood that drive mechanism 10 would further include at least one additional capstan and drive assembly disposed about output shaft 124, which would be directionally opposed to the drive assembly 76. This directionally opposed drive assembly (not shown) may include a sprocket assembly which rotates opposite the rotation of the sprocket assembly 82 by way of a directionally opposed toggle arm, or may alternatively include a counter wound capstan coil.

In use, when a tension is exhibited by one of the first and second drag elements 22, 24, as was described in the previous embodiments, the motion of the belt 112 will cause the capstan coil 112 to compress around the outer circumference of the output shaft 124, and thereby force the output shaft to rotate in the direction consistent with the movement of the belt 112 and capstan gears 120, 130. That is to say, when the sprocket assembly is rotated clockwise about axel 90 and drag element 22 is engaged, i.e., extended, the capstan 134 and output shaft will rotate clockwise. When the sprocket assembly is rotated counter-clockwise about axel 90 and drag element 24 is engaged, i.e., extended, the capstan 134 and output shaft will rotate counter-clockwise. The paired directionally opposed drive mechanism (not shown), as was described above, will similarly produce directionally opposed motion in response to lever 12 movement, thereby allowing continuous rotational movement of the output shaft 124. Disengagement of both drag elements 22, 24 releases the tension from the capstan coil 118 to allow free-wheeling, while engagement of both drag elements 22, 24 compresses the coil around the outer surface of the output shaft 124 without exhibiting a rotational force, thereby breaking the movement of the output shaft 124. As with the embodiment illustrated in FIG. 14, the introduction of a belt 112 having a first and second capstan chain 114, 118 and capstan coil 116 further reduced slippage within the drive mechanism 10.

It will be appreciated that, this drive mechanism described above may be placed in other manually operated, self propulsion vehicles in addition to wheelchairs.

The term belt as used herein should be broadly construed to cover functional equivalents that can frictionally engage a drum or similar surface with a tensioning of the belt that provides a force between the belt and surface normal to that surface thereby moderating the frictional force. As such, a belt may be constructed of a variety of materials sized and configured to provide the necessary flexibility, support the necessary tension and promote the necessary frictional engagement, including polymers, metals, composites, woven and nonwoven materials and the like. The term engaged as applied to the action between the belt and the capstan means a releasable attachment arising primarily from frictional contact between interface surfaces of the belt and the capstan.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications are hereby incorporated herein by reference in their entireties.

I claim:

1. A mechanism for converting a reciprocating action to unidirectional rotary motion comprising:
   a frame;
   a lever attached to the frame to pivot about a pivot point;
   an output shaft attached to the frame to rotate about a shaft axis;
   a first belt communicating with the lever to move in a first and second direction along a length of the first belt with reciprocating of the lever;
   a first rotatable capstan coupled to the output shaft, wherein the rotatable capstan provides an outer wall contacting a surface of the first belt with movement of the first belt; and
   a first drag element providing an outer wall contacting a surface of the first belt with movement of the first belt, the first drag element adapted to apply a drag tension against the first belt so that the first belt engages the outer wall of the rotatable capstan to rotate the same with a first direction of reciprocation of the lever and so that the first belt disengages the outer wall of the rotatable capstan with a second direction reciprocation of the lever to not rotate the same, wherein the first drag element provides an operator switching the drag element between a drag mode applying the drag tension against the first belt and a non-drag mode not applying the drag tension against the first belt.

2. The mechanism of claim 1 further including a second drag element providing an outer wall contacting a surface of the first belt with movement of the first belt, the second drag element being positioned on an opposite side of the first rotatable capstan with respect to the first drag element, the second drag element adapted to apply a drag tension against the first belt so that the first belt engages the outer wall of the rotatable capstan to rotate the same with a second direction of reciprocation of the lever and so that the first belt disengages the outer wall of the capstan with a first direction reciprocation of the lever to not rotate the same.

3. The mechanism of claim 2 wherein the first and second drag elements provide operators switching the drag elements between a drag mode applying the drag tension against the first belt and a non-drag mode not applying the drag tension against the first belt.

4. The mechanism of claim 1 wherein the rotatable capstan communicates with the output shaft through a gear linkage.

5. The mechanism of claim 1 including multiple rotatable capstans each having outer walls contacting the surface of the first belt with movement of the first belt wherein the first drag is adapted to apply a drag tension against the first belt so that the first belt engages the outer wall of each of the multiple rotatable capstans to rotate the same with a first direction of reciprocation of the lever and so that the first belt disengages the outer wall of each of the multiple rotatable capstans with a second direction of reciprocation of the lever to not rotate the same.

6. The mechanism of claim 1 wherein the drag element is selected from the group consisting of a hydraulic dash pot providing an operator controlling bypass of hydraulic fluid through the dashpot and an electric generator wherein the operator is a switch controlling bypass of electrical current through the electric generator.

7. The mechanism of claim 1 wherein the first belt is formed of a material selected from a group consisting of a polymeric composite material and a metal.

8. The mechanism of claim 1 further including:
   a second drag element providing an outer wall contacting a surface of the first belt with movement of the first belt, the second drag element being positioned on an opposite side of the first rotatable capstan with respect to the first drag element, the second drag element adapted to apply a drag tension against the first belt so that the first belt engages the outer wall of the rotatable capstan to rotate the same with a second direction of reciprocation of the lever and so that the first belt disengages the outer wall of the capstan with a first direction of reciprocation of the lever to not rotate the same;
   a second belt communicating the lever to move in a first and second direction along the length of the belt with reciprocating of the lever;
   a second rotatable capstan coupled to the output shaft, wherein the second rotatable capstan provides an outer wall contacting a surface of the second belt with movement of the second belt; and
   a second drag element providing an outer wall contacting a surface of the second belt with movement of the second belt, the second drag element adapted to apply a drav, tension against the second belt so that the belt engages the outer wall of the second rotatable capstan to rotate the same with a second direction of reciprocation of the lever and so that the second belt disengages the outer wall of the rotatable capstan with a first direction of reciprocation of the lever to not rotate the same.

9. The mechanism of claim 8 wherein the first and second rotatable capstans rotate to provide rotation of the output shaft in a single direction with reciprocation of the lever.

10. The mechanism of claim 8 further including:
a third drag element providing an outer wall contacting a surface of the first belt with movement of the first belt, the third drag element being positioned on an opposite side of the first rotatable capstan with respect to the first drag element, the third drag element adapted to apply a drag tension against the first belt so that the first belt engages the outer wall of the rotatable capstan to rotate the same with a second direction of reciprocation of the lever and so that the first belt disengages the outer wall of the capstan with a first direction of reciprocation of the lever to not rotate the same; and
a fourth drag element providing an outer wall contacting a surface of the second belt with movement of the second belt, the fourth drag element being positioned on an opposite side of the second rotatable capstan with respect to the second drag element, the fourth drag element adapted to apply a drag tension against the second belt so that the second belt engages the outer wall of the second rotatable capstan to rotate the same with a second direction of reciprocation of the lever and so that the first belt disengages the outer wall of the second capstan with a first direction of reciprocation of the lever to not rotate the same.

11. The mechanism of claim 10 wherein the second, third, and fourth drag elements provide operators switching the drag elements between a drag mode applying the drag tension against a respective belt and a non-drag mode not applying the drag tension against the respective belt.

12. The mechanism of claim 10 wherein the first and second rotatable capstans communicate with the output shaft through a gear linkage.

13. The mechanism of claim 10 including, for each of the first and second belts, multiple rotatable capstans each having outer walls contacting the surface of a respective belt with movement of the belt.

14. The mechanism of claim 10 wherein the drag element is selected from the group consisting of a hydraulic dash pot providing an operator controlling bypass of hydraulic fluid through the dash pot and an electric generator wherein the operator is a switch controlling bypass of electrical current through the electric generator.

15. The mechanism of claim 10 wherein the first belt is formed of a material selected from a group consisting of: a polymeric composite material; and a spring.

16. The mechanism of claim 10 further including a wheelchair and wherein the output shaft is mechanically coupled to a wheel of the wheelchair.

17. A manually propelled vehicle including a drive mechanism for converting a reciprocating linear motion to unidirectional rotary motion comprising:
a frame;
a seat attached to the frame for receiving an operator; and
at least two wheels attached to the frame to rotate about respective axles, each wheel having a drive mechanism including:
a lever attached to the frame to pivot about a pivot point;
an output shaft attached to the frame to rotate about a shaft axis;
a first belt communicating with the lever to move in a first and second direction along a length of the first belt with reciprocating of the lever;
a first rotatable capstan coupled to the output shaft, wherein the rotatable capstan provides an outer wall contacting a surface of the first belt with movement of the first belt;
a first drag element providing an outer wall contacting a surface of the first belt with movement of the first belt, the first drag element adapted to apply a drag tension against the first belt so that the first belt engages the outer wall of the rotatable capstan to rotate the same with a first direction of reciprocation of the lever and so that the first belt disengages the outer wall of the rotatable capstan with a second direction reciprocation of the lever to not rotate the same;
a second drag element providing an outer wall contacting a surface of the first belt with movement of the first belt, the second drag element being positioned on an opposite side of the first rotatable capstan with respect to the first drag element, the second drag element adapted to apply a drag tension against the first belt so that the first belt engages the outer wall of the rotatable capstan to rotate the same with a second direction of reciprocation of the lever and so that the first belt disengages the outer wall of the capstan with a first direction of reciprocation of the lever to not rotate the same;
a second belt communicating the lever to move in a first and second direction along the length of the belt with reciprocating of the lever;
a second rotatable capstan coupled to the output shall, wherein the second rotatable capstan provides an outer wall contacting a surface of the second belt with movement of the second belt; and
a second drag element providing an outer wall contacting a surface of the second belt with movement of the second belt, the second drag element adapted to apply a drag tension against the second belt so that the belt engages the outer wall of the second rotatable capstan to rotate the same with a second direction of reciprocation of the lever and so that the second belt disengages the outer wall of the rotatable capstan with a first direction reciprocation of the lever to not rotate the same.

* * * * *